United States Patent [19]

Page et al.

[11] 4,447,123

[45] May 8, 1984

[54] FIBER OPTIC SECURITY SYSTEM INCLUDING A FIBER OPTIC SEAL AND AN ELECTRONIC VERIFIER

[75] Inventors: Edward A. Page, Adelphi, Md.; Carl R. Babel, Annandale, Va.

[73] Assignee: Ensco Inc., Springfield, Va.

[21] Appl. No.: 288,042

[22] Filed: Jul. 29, 1981

[51] Int. Cl.³ .............................................. G02B 5/16
[52] U.S. Cl. .................... 350/96.24; 70/440; 250/227; 340/555; 350/96.10
[58] Field of Search ................. 350/96.1, 96.2, 96.24, 350/96.25; 250/227; 70/440; 340/380, 531, 555, 556, 557

[56] References Cited

U.S. PATENT DOCUMENTS

| | | | |
|---|---|---|---|
| 3,854,792 | 12/1974 | Koelle | 350/96.24 |
| 4,095,872 | 6/1978 | Stieff et al. | 350/96.24 |
| 4,106,849 | 8/1978 | Stieff | 350/96.24 |
| 4,130,341 | 12/1978 | Stieff | 350/96.20 |
| 4,161,348 | 7/1979 | Ulrich | 350/96.20 |
| 4,297,684 | 10/1981 | Butter | 340/557 |
| 4,367,460 | 1/1983 | Hodara | 250/227 X |

*Primary Examiner*—John D. Lee
*Attorney, Agent, or Firm*—Sixbey, Friedman & Leedom

[57] ABSTRACT

The present invention includes a fiber optic seal (2) including a transparent seal body (4) having two spaced apart cavities (12,14,52,54) formed therein. Both ends (36,38) of a fiber optic cable (28) are respectively secured within the spaced apart cavities (12,14,52,54). A microprocessor-based electronic verifier (60) injects light into one of the cable ends (38) via a plurality of illumination light guides (20) fixed within the seal body (4) between an external surface (6) thereof and the illumination cavity (12). Light emitted from the remaining end (36) of the fiber optic cable (28) is transmitted from the detection cavity (14) to the exterior surface (6) of the sealed body (4) via a plurality of detection light guides (24) fixed within the seal body (4). Thereafter, the light is measured and converted by the electronic verifier (60) to provide a seal signature.

31 Claims, 5 Drawing Figures

FIBER OPTIC SECURITY SYSTEM INCLUDING A FIBER OPTIC SEAL AND AN ELECTRONIC VERIFIER

TECHNICAL FIELD

The present invention relates in general to a fiber optic security system and more particularly to a security system wherein a fiber optic seal exhibiting as essentially unique "fingerprint" may be easily and reliably monitored by a microprocessor-based verifying apparatus in order to detect tampering with the seal.

BACKGROUND ART

The physical protection of, and accountability for, confidential materials is a matter of great concern in both the public and private sectors alike. There is a growing need for security seals which are simple to install yet provide a high degree of reliability. Additional constraints are imposed on security seal design by the requirement of nondestructive in-situ verification. Mechanical means for insuring the integrity of locked objects or enclosures have recently been supplanted by devices which exploit the advantages of fiber optic technology.

One prior art preassembled fiber optic security seal utilizes first and second connectors linked by a fiber optic bundle. One end of each optic fiber in the bundle is exposed through an opening in the first connector. The remaining end of each optic fiber is either exposed through a window in the second connector or wound around the hollow interior of the second connector and returned through the bundle to the opening in the first connector. The bundle is looped through a closure and the two connectors are snapped together to form the security seal. When light is thereafter passed through the opening in the first connector, the random intermixing of the optic fibers in the bundle produces a unique light output pattern or "fingerprint" from the fiber optic ends exposed in the window of the second connector and the fiber optic ends exposed through the opening of the first connector. Any tampering with the security seal after installation will disturb the individual optic fibers in the bundle, causing a different output pattern to appear than that observed at the time of installation.

U.S. Pat. No. 4,161,348 to Ulrich discloses a seal of this type wherein the use of an optic fiber bundle comprising spatially randomized optic fibers insures the generation of an essentially unique fingerprint for each individual seal arrangement. Although such seals have proven very effective, the reliance on visual fingerprint comparison during successive viewing intervals can detract from the reliability of the comparison operation. Indeed, the minute dimensions of the optic fibers in combination with the relatively large number of fibers involved often precludes accurate visual detection of small shifts in the output pattern. It is thus possible for a sophisticated intruder to violate the integrity of such seals without detection.

In an effort to overcome some of the disadvantages associated with the visual seal verification technique, security seal systems have been developed utilizing viewers of various types to sense the light pattern produced by the seal. A very effective reticle pattern viewer to measure the relative radial and polar coordinates of various light transmitting fiber ends in an illuminated fiber optic seal is disclosed in U.S. Pat. No. 4,095,872 to Stieff. Here the radial and polar coordinates are recorded for subsequent comparison purposes.

Alternately, a fiber optic seal may be inspected for signs of tampering by matching a positive or negative photograph of the seal fingerprint taken during the inspection with a negative or positive photograph of the seal fingerprint taken at the time of seal installation. Unfortunately, the measurement of the radial and polar coordinates of illuminated fiber ends, or the point by point comparison of photographic prints, is a time-consuming process normally requiring the use of a microscope, photographic equipment and other bulky equipment which severly limits applicability. This process is also subject to inaccuracy if there is misalignment between the viewer or camera and the fiber ends which create the seal fingerprint. Moreover, seal security may be surreptitiously compromised by inserting a photographic mask across that portion of the seal window observed during the illumination/verification process.

Microprocessor controlled fiber optic seal systems have been developed to enhance seal control and monitoring. In one known type of seal, a light source under the control of a microprocessor illuminates one end of the bundle with a time-ordered random number, while a photo-transistor circuit arranged at the remaining end of the bundle detects the random number in the form of light transmitted through the bundle. Any interruption of the light transmission or harrassment of the system circuitry clears the random number generator in the microprocessor to provide an indication of tampering. Systems of this type are illustrated in U.S. Pat. Nos. 4,106,849 and 4,130,341 to Stieff, and these systems eliminate the subjective uncertainties associated with earlier prior art fiber optic security seals. However, these systems do rely upon the transmission of a unique, confidential random number sequence to provide seal verification. If this random number sequence for a given seal can be ascertained, electronically or otherwise, the sequence can be duplicated in counterfeit fashion and used to defeat the integrity of the original seal.

There remains a need in the art for a truely reliable fiber optic seal which is simple to construct and install yet maintains a high degree of security.

DISCLOSURE OF INVENTION

A primary object of the present invention is to provide a novel and improved security seal wherein fiber optics are utilized to provide a unique seal signature which may be accurately verified in-situ. This verification may be accomplished without the need for precise positioning of a verifier apparatus relative to the security seal.

A further object of the present invention is to provide a fiber optic security seal which is simple to construct and which provides an essentially unique seal signature in a manner to facilitate either intermittant or continuous monitoring of the signature.

Another object of the present invention is to provide a novel and improved fiber optic security seal which includes a seal body having an illumination cavity formed therein. A plurality of illumination light guides are fixed within the seal body to extend from the inner end of the illumination cavity to a surface of the seal body. The ends of these illumination light guides adjacent to the surface of the seal body are spaced apart to facilitate separate light transmission through each of the illumination light guides to the illumination cavity. The end of a fiber optic cable is secured within the illumination cavity to receive light from the illumination light guides.

A further object of the present invention is to provide a novel and improved fiber optic security seal which includes a seal body having a detection cavity formed therein. A plurality of detection light guides are fixed within the seal body to extend from the inner end of the detection cavity to a surface of the seal body. The ends of these detection light guides adjacent to the surface of the seal body are spaced apart to facilitate the detection of light from a fiber optic cable secured within the detection cavity.

Yet another object of the present invention is to provide a novel and improved fiber optic security seal which includes a seal body having an illumination cavity and a detection cavity formed therein, the inner end of each said cavity terminating within the seal body. One end of a fiber optic cable is secured within each of the cavities, and a plurality of light guides are fixed within the seal body to conduct light between the respective end of the fiber optic cable and the surface of the seal body. The ends of the light guides are spaced apart adjacent to the surface of the seal body.

A further object of the present invention is to provide a novel and improved fiber optic security seal system which includes a seal body having opposite ends of a fiber optic cable secured therein so as to terminate internally within the seal body. A plurality of illumination light guides are fixed within the seal body to transmit light between the surface of the seal body and one end of the fiber optic cable, while a separate plurality of detection light guides are fixed within the seal body to conduct light between the surface of the seal body and the remaining end of the fiber optic cable. An electronic verifier is provided to derive a seal signature by transmitting light into the illumination light guides and sensing the light conducted by the detection light guides. This verifier then compares the resultant detected light output which a previously stored light output pattern produced by the same seal.

A still further object of the present invention is to provide a novel and improved electronic verifier for a fiber optic seal which includes a light source for injecting light into the seal, and a photodetector unit for detecting the light emitted by the seal in response to the injected light. The verifier includes a control unit which controls the injection of light by the light source and which computes a seal signature in the form of a representation which is a function of the intensity of the light sensed by the photodetector unit.

These and other objects of the present invention are achieved by a fiber optic security seal wherein both ends of a fiber optic cable are respectively secured within separate illumination and detection cavities in a transparent seal body. The diameters of the cavities are slightly larger than the diameter of the fiber optic cable, and a plurality of illumination light guides fixed within the seal body optically communicate with one end of the fiber optic cable, while a plurality of detection light guides also fixed within the seal body optically communicate with the other end of the fiber optic cable. A microprocessor-based electronic verifier injects light into one of the illumination light guides, whereupon the light is coupled at different intensities into individual optical fibers in the fiber optic cable. Light thereafter propagates through the length of the fiber optic cable and emerges from the cable in a unique output pattern. The detection light guides transmit varying amounts of light from the fiber optic cable to the surface of the seal body in accordance with the location of the detection light guides relative to the individual optical fibers in the cable. Light levels in the detection light guides are detected by verifier light guide/photodetector assemblies and recorded. The verifier light guides have larger diameters than the detection light guides, thus eliminating the need for precise positioning of the verifier relative to the seal body.

The entire illumination procedure is repeated for each of the remaining illumination light guides and the resulting set of recorded light levels are electronically processed in the verifier to produce a unique seal "fingerprint" or signature. The seal signature is stored in a memory for later comparison and verification purposes. Differences between the stored seal signature and seal signatures obtained during subsequent illumination and detection operations are indicative of intervening tampering with the seal. In this regard, the diameter differential between the seal body cavities and the fiber optic cable is advantageous. The tolerance within the seal body cavities results in a unique positional relationship between the cavities and the fiber optic cable each time the ends of the cable are secured to the seal body. Consequently, any attempts at removing and then reinserting the fiber optic cable in the seal body between verifications can easily be detected.

BEST MODE FOR CARRYING OUT THE INVENTION

Figure 1:
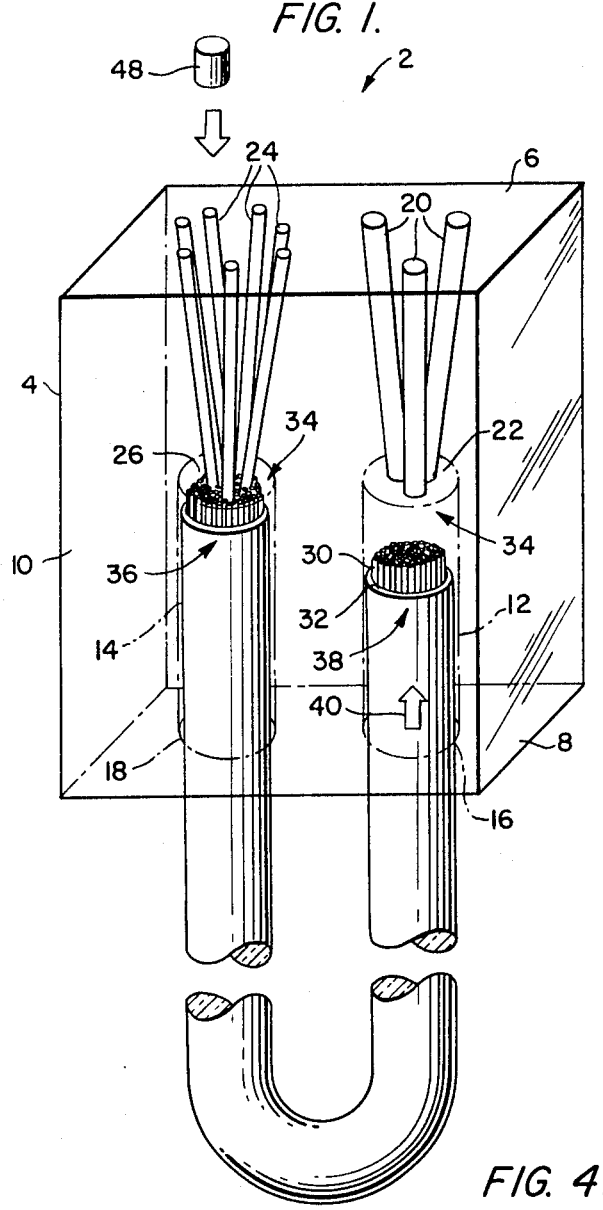
FIG. 1 is a perspective view of the fiber optic seal of the present invention, showing the position of the illumination and detection light guides relative to the fiber optic cable.

A fiber optic seal 2 constructed in accordance with the present invention is illustrated in detail in FIG. 1. Fiber optic seal 2 includes a transparent seal body 4 of epoxy or similar durable plastic material having top, bottom and side surfaces indicated respectively at 6,8 and 10. In the preferred embodiment of FIG. 1, the top, bottom and side surfaces of the seal body are oriented in a block or cube-like configuration, but the exact shape of the seal body is not critical. Equal success in practicing the present invention may be achieved with a seal body having, for example, a cylindrical configuration.

A pair of spaced-apart cavities 12 and 14 extend from respective openings 16 and 18 in the bottom surface 8 to the interior of seal body 4. As explained in greater detail hereinbelow, cavity 12 serves as an illumination cavity while cavity 14 serves as a detection cavity. A plurality of illumination light guides 20 branch upward and outward from the inner end 22 of illumination cavity 12 to terminate in splayed fashion at one end of top surface 6. Similarly, a plurality of detection light guides 24 branch upwardly and outwardly from the inner end 26 of detection cavity 14 to terminate in splayed fashion at the opposite end of top surface 6. Each of the plurality of illumination and detection light guides is fabricated from a single large diameter optical-grade fiber molded or otherwise fixed in the seal body 4. Consequently, each illumination and detection light guide provides a separate light path between the illumination or detection cavity associated therewith and the exterior surface of fiber optic seal 2.

Altough the FIG. 1 embodiment of fiber optic seal 2 employs three illumination light guides and seven detection light guides, it is to be understood that alternative embodiments of the fiber optic seal may utilize greater or lesser numbers of illumination and detection light guides with satisfactory results. Also, the seal body 4 may constitute a single block, or a two piece clamp wherein the pieces are secured together after a fiber optic cable is secured in place.

Fiber optic seal 2 also includes a multistrand fiber optic cable 28 of the type comprising a bundled plurality of randomly intermixed optical fibers 30 surrounded by a flexible, protective covering 32. The diameter of the cable 28 and covering 32 is somewhat smaller than the diameters of illumination and detection cavities 12 and 14 in seal body 4.

Fiber optic cable 28 is designed to be looped through a pair of locking flanges or other apertures (not shown) and secured to seal body 4 in a manner which permits the integrity of the fiber optic seal, and consequently the integrity of the enclosure protected by the locking flanges, to be quickly and reliability verified. Installation of the fiber optic seal 2 is a simple matter. Fiber optic cable 28 may be cut to the desired length, if necessary. One end 36 of fiber optic cable 28 is then inserted in detection cavity 14 and permanently fixed in place with a clamp structure or other suitable means for affixing the cable within the cavity. The remaining end 38 of fiber optic cable 28 is thereafter threaded through the locking flanges and inserted into illumination cavity 12, as indicated by arrow 40. Again, means are provided, such as a clamp, to permanently fix the end 38 of fiber optic cable 28 in place within the cavity 12. At this point, the installation of fiber optic seal 2 is complete.

Figure 2:
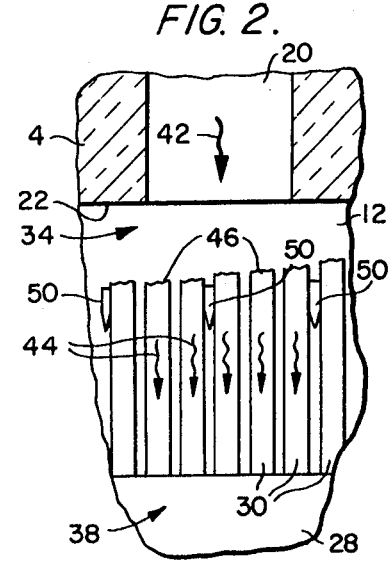
FIG. 2 is an enlarged view of the detection cavity in the seal body, showing the random irregularities in the exposed fiber optic tips of the fiber optic cable relative to one of the illumination light guides.

In-situ verification of seal integrity is accomplished by sequentially injecting light through illumination light guides 20 and into end 38 of fiber optic cable 28 to produce an output pattern at end 36 of the fiber optic cable, which output pattern may then be detected with the detection light guides 24. Turning to FIG. 2, it can be seen that light travelling down one of the illumination light guides 20, as indicated by arrow 42, is coupled into the exposed tips 34 of various optical fibers 30, as indicated by arrows 44, after passing a short distance through illumination cavity 12. The light subsequently propogates the length of fiber optic cable 28 and emerges from end 36 of the fiber optic cable in a highly unique output pattern. Such uniqueness for a given fiber optic seal 2 is effectively guaranteed by the random spatial relationships established between the optical fibers 30 as a result of fiber intermixing along the length of fiber optic cable 28. Moreover, the shearing of the fiber optic cable 28 during installation produces random irregularities 46 in the exposed fiber tips 34, and these irregularities generate reflection and refraction phenomena in the individual optical fibers 30 which enhance the uniqueness attributable to optical fiber intermixing. It is therefore possible, for each illumination light guide 20 injected with light, to obtain the functional equivalent of a fingerprint from the exposed optical fiber tips 34 at the end 36 of fiber optic cable 28. This "fingerprint" or "signature" associated with each illumination light guide in turn produces a light transmission of unique intensity through each of the detection light guides 24 in accordance with the location of the detection light guides relative to end 36. The transmitted light intensities are received at top surface 6 and electronically recorded for further analysis in an electronic verifier of the type disclosed in connection with FIG. 5. It should be noted that the splayed positioning of detector light guides 24 about top surface 6 readily enables simultaneous monitoring of the detection light guides with large diameter verifier light guides such as verifier light guide 48 illustrated schematically in FIG. 1. The splayed positioning of detection light guides 24 also significantly reduces the need for precise verifier alignment when large diameter verifier light guides are used. It is readily apparent that detection using the large diameter, splayed detection light guides is both easier and more accurate than attempting to detect the light pattern provided from the minute fiber ends of the fiber optic cable.

Simple calculations reveal that the number of potential permutations in light output pattern, as detected by detection light guides 24, is quite large For instance, if the light transmissions in each of the detection light guides 24 is monitored and resolved into one of 16 different intensity levels, the number of discrete combinations of light intensity levels for a fiber optic seal having seven detection light guides and three sequentially injected illumination light guides would provide $16^{21}$ or greater than $10^{25}$ possible seal signatures. If light transmissions through the detection light guides were monitored only six times, (i.e. three detection light guides each illuminated twice in response to the sequential injection of light through two illumination light guides) and the monitored light transmissions were resolved into only eight light intensity levels, $8^6$ or more than 240,000 different signatures could still be obtained from the seal. Even allowing for tolerances in the signature comparison process, the sheer magnitude of the numbers involved demonstates the effective uniqueness of the signature associated with each fiber optic seal. An intruder attempting to circumvent the operation of the seal undetected would face an extremely difficult task.

Gross tampering with the internal construction of seal body 4 is immediately observable due to the transparency of the seal body. Therefore, if an intruder cuts the fiber optic cable 28, subsequent reassembly of the cut ends will modify the light level intensities existing between the intertwined optical fibers 30, thus producing a detectable shift in the light output pattern transmitted through light detection guides 24. If removal of the fiber optic cable 28 from either the illumination 12 or detection cavity 14 occurs followed by reinsertion, this tampering is likewise detectable, for it is virtually impossible to accutately preserve and realign the positions of the various optical fiber tips 34 relative to the associated illumination 20 and detection 24 light guides. This difficulty, of course, is enhanced by the diameter differential which exists between the fiber optic cable 28 and the cavities 12 and 14. If desired, additional protection against removal and reinsertion can be obtained by forming small obstructions 50 in the illumination and detection cavities 12,14 to insure the unique, randomized spreading of the optical fiber tips 34 each time optic fiber cable 28 is pushed into the cavities.

More sophisticated efforts to cover up tampering with the fiber optic seal 2 of the present invention are likewise relatively easy to detect. Assuming that a practical way of variably attenuating individual optical fibers in-situ could be developed, it is nevertheless evident that unless the random irregularities 46 in the exposed optical fiber tips 34 could be duplicated for a given fiber optic seal, no set of attentuations could produce the correct light output pattern at fiber optic cable end 36 in response to the injection of light through each and every one of the illumination light guides 20. This circumstance necessarily arises because the amount of light coupled between an individual optical fiber and an individual illumination or detection light guide is a sensitive function of the incident angle of the coupled light. This incident angle is in turn a function of the random irregularities existing at the tip of the individual optical fiber 30. The effect of coupling light from multiple illumination light guides 20 through the random irregularities 46 in the exposed optical fiber tips 34 also eliminates the possibility of using masks along the inner end 26 of detection cavity 14 to duplicate the light output pattern at the fiber optic cable end 36 of a given fiber optic seal 2. In summary, then, the fiber optic seal of the present invention offers a high degree of security together with simplicity of construction and ease of installation.

Figure 3:
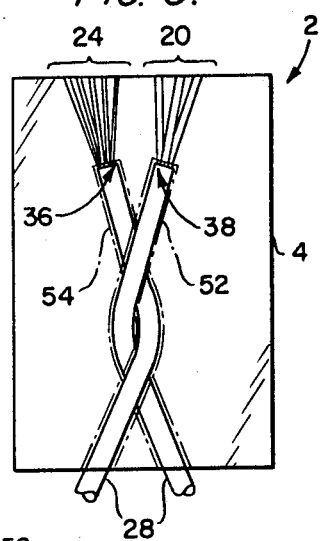
FIG. 3 illustrates an alternative embodiment of the present invention, wherein the illumination and detection cavities are intertwined.
Figure 4:
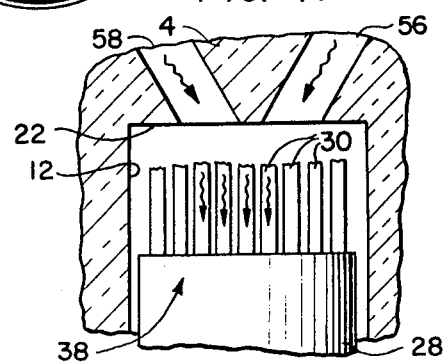
FIG. 4 illustrates a third embodiment of the present invention wherein the positions of the illumination light guides in the seal body are shifted relative to the exposed fiber optic tips of the fiber optic cable in order to vary the azimuth and incident angle of light striking the fiber optic tips.

FIGS. 3 and 4 illustrate alternative embodiments of a fiber optic seal 2 wherein the uniqueness of the seal signature is enhanced. Turning first to FIG. 3, seal body 4 may be molded in a manner such that illumination cavity 52 and detection cavity 54 twist around each other as illustrated. Respective insertion of the fiber optic cable ends 36, 38 into the twisted illumination and detection cavities 52 and 54 additionally stresses the individual optical fibers 30 in fiber optic cable 28, thereby increasing the randomized intermixing between the optical fibers and further guaranteeing the uniqueness of the light output pattern at fiber optic cable end 36.

In FIG. 4, the illumination light guides, partially indicated at 56 and 58, are fixed within the seal body 4 at various angles to provide variation in the azimuth and incident angle of light coupled into the individual optical fibers 30. Again, the uniqueness of the light output pattern at fiber optic cable end 36 enhances the uniqueness of the seal signature.

Figure 5:
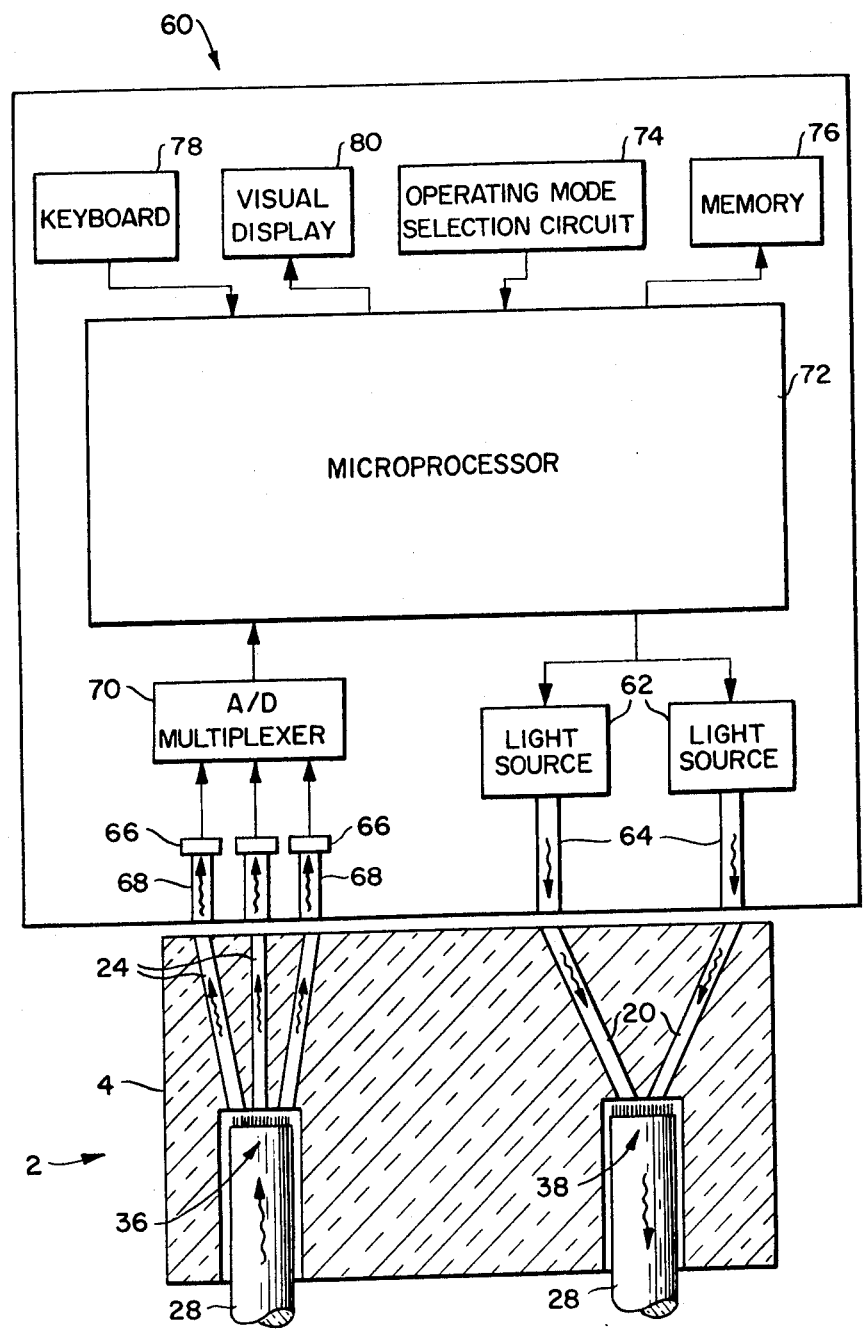
FIG. 5 is a block diagram of a microprocessor-based electronic verifier for use in verifying the seal signature produced by the fiber optic security seal of the present invention.

An electronic verifier for use in conjunction with the fiber optic seal of FIGS. 1-4 is schematically illustrated in FIG. 5. Electronic verifier 60, which may be constructed as a hand-held unit, includes one light source 62 with attached injector light guide 64 for each illumination light guide 20 in seal body 4 and one photodetector 66 with attached verifier light guide 68 for each detection light guide 24 in seal body 4. A monolithic A/D multiplexer 70 is connected to receive the output of photodetectors 66. Microprocessor 72 governs the operation of light sources 62 while receiving signals from A/D multiplexer 70. Microprocessor 70 may employ readily available pocket calculator microporcessor system components such as a National Semiconductor MM5758 calculator chip, MM5756 programmer and a DS8868 digit multiplexer and keyboard scanner. ROM control sequences are utilized to control the micropocessor and related external circuitry. An operating mode selection circuit 74 taps the various ROM control sequences, enabling the verifier to assume either a seal signature determination mode, a signature verification mode, a test and calibration mode, or a memory read-out and signature entry mode.

In the seal signature determination mode, microprocessor 72 initially commands one of the light sources 62 to inject light through an injector light guide 64 and into the illumination light guide 20 associated therewith. Illumination light guide 20 couples the injected light into the exposed optical fiber tips at end 38 of fiber optic cable 28, as disclosed above. Light so coupled continues to propagate the length of fiber optic cable 28 and emerges in a unique light output pattern from the exposed optical fiber tips at end 36 of the fiber optic cable, as also disclosed above. Light is thereafter transmitted through each of the detection light guides 24 with an intensity which varies in accordance with the positioning of that particular detection light guide relative to the exposed optical fiber tips at fiber optic cable end 36. The light transmissions from the detection light guides 24 are respectively received by the verifier light guides 68, converted into electrical signals by photodetectors 66 and quantized by A/D multiplexer 70 to provide a set of digital values representative of the light output pattern at fiber optic cable end 36. The light injection procedure is then repeated for each of the remaining illumination light guides 20 to provide additional sets of digitized values representative of the light output patterns generated in connection with the illumination of each of the remaining illumination light guides. Taken together, all of the digitized values constitute an electronic signature capable of uniquely identifying the fiber optic seal. If desired, the digitized values may be nonlinearly transformed to increase the dynamic range of the verifier and normalized to render the signature independent of variations in the illumination level generated by light sources 62. The transformed and normalized digital values are subsequently stored in a non-volatile memory 76 for furture comparison purposes.

When the verifying mode is selected, a two-digit number identifying the fiber optic seal to be verified is entered into verifier 60 via a keyboard 78, whereupon the stored seal signature for the identified fiber optic seal is accessed from memory 76. The identified seal is brought into registry with verifier 60, and the current seal signature is obtained as in the seal signature determination mode. A seal identification can also be achieved by optical coding, such that the seal is identified and the signature accessed during the verification process so that a comparison between the current seal signature and the stored seal signature is computed. A difference in the two seal signatures indicates tampering, and the outcome of this comparison may be displayed in a visual display component 80.

The test and calibration mode enables verifier 60 to be monitored for effects of temperature, aging or the like. Calibration circuitry (not shown) in the verifier permits digital correction factors to be stored for automatic compensation of verifier operation. In one embodiment, the correction factors may be determmned by using a calibration seal (not shown) having directly connected illumination and detection light guides. When the calibration seal is brought into registry with verifier 60, the relative light levels generated by each light source can be set against an internally stored reference to establish correction factors. In another embodiment, a fiber optic network (not shown) internal to the verifier itself serves to guide a fixed fraction of light between the light sources 62 and the photodetectors 66. Light levels measured in this manner can be stored as reference and correction values for individual light sources. In yet another embodiment, digital correction factors may be determined from optical sampling carried out with a single photodetector (not shown) and stepping motor arrangement (not shown).

In the memory read-out and signature entry mode, seal signatures may be copied from other verifiers or transferred to external storage devices through an input/output device connected to memory 76.

For continuously monitored systems, the verifier 60 may be permanently connected to one or more seals 2. For a plurality of seals, the microprocessor would sequence from one seal to the next to individually check the signature of each seal.

We claim:

1. A fiber optic seal for receiving a fiber optic cable formed by a plurality of optical fibers comprising a seal body having cavity means extending from a cavity opening in an outer surface of said body and terminating at a terminal end within said seal body and light guide means secured in said seal body in fixed relationship thereto, said light guide means, including a plurality of individual, elongated light guides having first ends positioned adjacent the terminal end of said cavity means and second ends positioned adjacent an outer surface of said seal body and being operative to conduct light between the terminal end of said cavity means and the outer surface of said seal body.

2. A fiber optic seal for receiving a fiber optic cable formed by a plurality of optical fibers comprising a seal body having cavity means extending from a cavity opening in an outer surface of said body and terminating at a terminal end within said seal body, the inner diameter of said cavity means being greater than the outer diameter of the fiber optic cable to be received by said fiber optic seal, and light guide means secured in said seal body in fixed relationship thereto, said light guide means being operative to conduct light between the terminal end of said cavity means and an outer surface of said seal body.

3. A fiber optic seal for receiving a fiber optic cable formed by a plurality of optical fibers comprising a seal body having cavity means extending from a cavity opening in an outer surface of said body and terminating at a terminal end within said seal body and light guide means secured in said seal body in fixed relationship thereto, said light guide means being operative to conduct light between the terminal end of said cavity means and an outer surface of said seal body which is substantially opposite to the surface containing said cavity opening.

4. A fiber optic seal for receiving a fiber optic cable formed by a plurality of optical fibers comprising a seal body having cavity means extending from a cavity opening in an outer surface of said body and terminating at a terminal end within said seal body said cavity means being formed to stress the individual optical fibers in said fiber optic cable to cause randomized intermixing between the fibers of the cable, and light guide means secured in said seal body in fixed relationship thereto, said light guide means being operative to conduct light between the terminal end of said cavity means and an outer surface of said seal body.

5. A fiber optic seal for receiving a fiber optic cable formed by a plurality of optical fibers comprising a seal body having a cavity means extending from a cavity opening in an outer surface of said body and terminating at a terminal end within said seal body, said cavity means including an illumination cavity extending from a first opening in an outer surface of said seal body to an illumination cavity terminal end within said seal body and a detection cavity extending from a second opening in the outer surface of the seal body to a detection cavity terminal end within said seal body, said detection cavity extending in spaced relationship to said illumination cavity, and light guide means secured in said seal body in fixed relationship thereto, said light guide means being operative to conduct light between the terminal ends of said detection and illumination cavities and an outer surface of said seal body.

6. The fiber optic seal of claim 5, wherein the light guide means for conducting light between the terminal end of said detection cavity and an outer surface of said seal body includes a plurality of individual, elongated, spaced light guides having first ends positioned adjacent the terminal end of said detection cavity and second ends positioned adjacent the outer surface of said seal body, said second ends being spaced a greater distance apart than said first ends.

7. The fiber optic seal of claim 5, wherein the light guide means for conducting light between the terminal end of said illumination cavity and an outer surface of said seal body includes at least two individual, elongated spaced light guides having first ends positioned adjacent the terminal end of said illumination cavity and second ends positioned adjacent the outer surface of said seal body, the central longitudinal axis of each of said light guides at the first ends thereof being angularly positioned relative to the central longitudinal axis of said illumination cavity.

8. The fiber optic seal of claim 5, wherein the light guide means for conducting light between the terminal ends of said illumination and detection cavities and the outer surface of said seal body includes a plurality of individual, elongated spaced light guides for each such cavity, said light guides having first ends positioned adjacent the terminal end of the respective cavity and second ends positioned adjacent the outer surface of said seal body, said second ends being spaced a greater distance apart than said first ends.

9. The fiber optic seal of claim 8, wherein said seal body is transparent.

10. A fiber optic seal for securing an enclosure comprising a fiber optic cable formed by a plurality of optical fibers, a seal body within which at least a first terminal end of said cable is secured, the secured end of said cable being positioned within said seal body, and light guide means secured in said seal body in fixed relationship thereto, said light guide means including a plurality of individual elongated light guides having first ends positioned adjacent the secured terminal end of said cable and second ends positioned adjacent an outer surface of said seal body and being operative to conduct light between the secured terminal end of said cable and an outer surface of said seal body.

11. The fiber optic seal of claim 10 wherein said elongated light guides are of greater diameter than the diameter of the fibers forming said cable.

12. The fiber optic seal of claim 11 wherein the second ends of said elongated light guides are spaced a greater distance apart than the first ends thereof.

13. The fiber optic seal of claim 10 wherein said seal body includes a cavity for receiving a second terminal end of said cable, said cavity extending from a cavity opening in an outer surface of said body and terminating at a cavity terminus within said seal body, and second light guide means secured in said seal body in fixed relationship thereto, said second light guide means being operative to conduct light between the cavity terminus and the outer surface of said seal body.

14. The fiber optic seal of claim 13 wherein the diameter of said cavity is greater that the diameter of said cable.

15. A fiber optic seal comprising a fiber optic cable for conducting light, said figer optic cable including a first end to be illuminated by light from an external light source and a second end which emits light in response to the illumination of said first end and a seal body having first and second cavities formed therein for respectively receiving said first and second ends of said fiber optic cable, said seal body also having a first light guide means connected between the exterior surface of said seal body and said first cavity for transmitting light from the external light source to said first end of said fiber optic cable when said first end is received by said first cavity and a second light guide means connected between said external surface of said seal body and said second cavity for transmitting light emitted from said second end of said fiber optic cable to said exterior surface when said second end is received by said second cavity.

16. A fiber optic seal as set forth in claim 15, wherein said fiber optic cable includes a bundled plurality of intermingled optical fibers having random spatial orientations relative to one another.

17. A fiber optic seal as set forth in claim 16, wherein said first light guide means includes at least one illumination light guide having a diameter larger than the individual diameters of said optical fibers in said fiber optic cable and said second light guide means includes at least one detection light guide having a diameter larger than the individual diameters of said optical fibers in said fiber optic cable.

18. A fiber optic seal as set forth in claim 17, wherein said first light guide means includes a plurality of illumination light guides and said second light guide means includes a plurality of detection light guides.

19. A fiber optic seal as set forth in claim 18, wherein said plurality of illumination light guides are oriented to couple light into said first end of said fiber optic cable at different angles of incidence.

20. A fiber optic seal as set forth in claim 16, wherein said intermingled bundle of optical fibers is exposed at both said first and second ends of said fiber optic cable means.

21. A fiber optic security seal as set forth in claim 20, wherein each of said exposed optical fibers at said first end of said fiber optic cable has a tip exhibiting random irregularities.

22. A fiber optic security seal as set forth in claim 20 wherein at least one of said first and second cavities includes means to spread the exposed optical fibers received in said cavity.

23. A fiber optic security seal as set forth in claim 15, wherein said first and second cavities formed in said seal body are intertwined.

24. A fiber optic security seal system for the detection of tampering with a sealed enclosure, said fiber optic security seal system comprising
a fiber optic cable for conducting light, said fiber optic cable including a first end which may be illuminated by a light source and a second end which emits light in response to the illumination of said first end,
fiber optic seal body means for receiving said first and second ends of said fiber optic cable, said fiber optic seal body means also having a first light guide means connected between the exterior surface of said fiber optic seal body and said first cable end for transmitting light from the light source to the first end of said fiber optic cable and a second light guide means connected between said exterior surface of said fiber optic seal body and said second cable end for transmitting light emitted by the second end of said fiber optic cable, and
an electronic verifier means for deriving a seal signature, said electronic verifier means including at least one light source means for illuminating said first end of said fiber optic cable, said light source means including a light injection guide means for registry with said first light guide means at said external surface of said fiber optic seal body to inject light from said light source means into said first light guide means,
at least one light detecting means for generating an output signal in response to light emitted from said second end of said cable, said light detecting means including a verfier guide means for registry with said second light guide means at said external surface of said fiber optic seal body to direct light from said second light guide means into said light detecting means, and
electronic circuit means connected to both said light source means and said light detecting means for controlling the injection of light into said first light guide means and for processing said output signal from said light detecting means to derive a seal signature representation indicative of the intensity of light directed into said light detecting means from said second light guide means.

25. The fiber optic security seal system of claim 24, wherein said second light guide means includes a plurality of spaced detection light guides for transmitting light from the second end of the fiber optic cable to said verifier guide means, said light detecting means including photodetector means positioned to receive light from said verifier guide means, said photodetector means operating to provide an output signal which is a function of the light intensity of the light received from said verifier guide means.

26. The fiber optic security seal system of claim 24, wherein said electronic circuit means for the electronic verifier means includes memory means for storing a previously derived seal signature representation.

27. An electronic verifier apparatus for verifying the signature of a fiber optic security seal which includes a fiber optic cable having a first cable end arranged to receive light and a second cable end arranged to emit light in response to the light received by the first cable end, said electronic verifier apparatus comprising at least one light source means for injecting light into the first cable end of said fiber optic cable, at least one photodetector means for generating an output signal in response to light emitted by the second cable end of said fiber optic cable, and electronic circuit means connected to both said light source means and said photodetector means for controlling the injection of light into the first end of the fiber optic cable and for deriving a seal signature representation indicative of the intensity of the light received from said second cable end.

28. The electronic verifier apparatus of claim 27, wherein said electronic circuit means includes memory means for storing a previously derived seal signature representation.

29. The electronic verifier apparatus of claim 27, wherein said light source means includes a plurality of separate light sources for separately injecting light into a portion of said first cable end and a separate light guide for each light source arranged to transmit light from said light source.

30. The electronic verifier apparatus of claim 27, wherein said photodetector means includes a plurality of separate photodetectors and a separate verifier light guide for transmitting light to each such photodetector.

31. The electronic verifier apparatus of claim 30, wherein said electronic circuit means includes an analog to digital converter and multiplexer means connected to said photodetectors for providing a digital output which is a function of the photodetector output and a microprocessor means connected to receive said digital output.

* * * * *